(12) United States Patent
Staufer et al.

(10) Patent No.: US 12,549,365 B2
(45) Date of Patent: Feb. 10, 2026

(54) APPARATUS, METHOD, AND COMPUTER PROGRAM

(71) Applicant: Nokia Technologies Oy, Espoo (FI)

(72) Inventors: Markus Staufer, Munich (DE); Peter Schneider, Munich (DE); Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 153 days.

(21) Appl. No.: 18/447,098

(22) Filed: Aug. 9, 2023

(65) Prior Publication Data

US 2024/0056302 A1 Feb. 15, 2024

Related U.S. Application Data

(60) Provisional application No. 63/371,305, filed on Aug. 12, 2022.

(51) Int. Cl.
*H04L 9/32* (2006.01)
*H04L 9/08* (2006.01)

(52) U.S. Cl.
CPC ............ *H04L 9/321* (2013.01); *H04L 9/0819* (2013.01)

(58) Field of Classification Search
CPC ............. H04L 2209/80; H04L 63/0869; H04L 9/0819; H04L 9/0838; H04L 9/321; H04W 12/04; H04W 12/06; H04W 12/106
See application file for complete search history.

(56) References Cited

U.S. PATENT DOCUMENTS

| 12,267,676 | B2 * | 4/2025 | Rajadurai | ......... H04W 12/0433 |
| 2022/0116774 | A1 * | 4/2022 | Rajadurai | ........... H04W 12/041 |
| 2022/0150696 | A1 * | 5/2022 | Rajadurai | ........... H04W 12/041 |

(Continued)

FOREIGN PATENT DOCUMENTS

WO WO-2023175461 A1 * 9/2023

OTHER PUBLICATIONS

ETSI TS 133 535 v17.6.0 pp. 1-26 (Jul. 2022) (Year: 2022).*

(Continued)

*Primary Examiner* — Sharon S Lynch
(74) *Attorney, Agent, or Firm* — Ryan, Mason & Lewis, LLP

(57) ABSTRACT

There is provided an apparatus, method and computer program for causing a first apparatus to: obtain an identifier of a cryptographic key according to a first security communication protocol; signal, to a second apparatus, a first authentication request according to a second security communication protocol, the first authentication request comprising the identifier of the cryptographic key and a first verifying information according to a second security communication protocol, wherein the first verifying information comprises a first value calculated using the cryptographic key; receive, from the second apparatus, an authentication response according to the second security communication protocol, the authentication response comprising a second verifying information according to the second security communication protocol, wherein the second verifying information comprises a second value; and verify the second apparatus for the second security communication protocol using the second value and the cryptographic key.

12 Claims, 13 Drawing Sheets

(56) References Cited

U.S. PATENT DOCUMENTS

| | | | | |
|---|---|---|---|---|
| 2023/0397007 | A1* | 12/2023 | Wifvesson | H04W 12/37 |
| 2024/0314534 | A1* | 9/2024 | Shi | H04W 76/14 |
| 2025/0168635 | A1* | 5/2025 | Stojanovski | H04W 12/0433 |

OTHER PUBLICATIONS

"3rd Generation Partnership Project; Technical Specification Group Services and System Aspects; Study on personal IoT networks security aspects (Release 18)", 3GPP TR 33.882, V0.1.0, Jun. 2022, pp. 1-8.

PCT Application No. PCT/EP2022/072735, "Methods and Devices for Uplink Transmission", filed on Aug. 12, 2022, pp. 1-43.

"3rd Generation Partnership Project; Technical Specification Group Services and System Aspects; Generic Authentication Architecture (GAA); Access to network application functions using Hypertext Transfer Protocol over Transport Layer Security (HTTPS) (Release 17)", 3GPP TS 33.222, V17.2.0, Jun. 2022, 37 pages.

Rigney et al., "Remote Authentication Dial In User Service (RADIUS)", RFC 2865, Network Working Group, Jun. 2000, pp. 1-76.

Aboba et al., "RADIUS (Remote Authentication Dial In User Service) Support For Extensible Authentication Protocol (EAP)", RFC 3579, Network Working Group, Sep. 2003, pp. 1-46.

Zorn, "Microsoft Vendor-specific RADIUS Attributes", RFC 2548, Network Working Group, Mar. 1999, pp. 1-41.

Kaufman et al., "Internet Key Exchange Protocol Version 2 (IKEv2)", RFC 7296, Internet Engineering Task Force (IETF), Oct. 2014, pp. 1-42.

Fairhurst, "Datagram Congestion Control Protocol (DCCP) Simultaneous Open Technique to Facilitate NAT/Middlebox Traversal", RFC 5596, Network Working Group, Sep. 2009, pp. 1-25.

Aboba et al., "Extensible Authentication Protocol (EAP)", RFC 3748, Network Working Group, Jun. 2004, pp. 1-67.

Aboba et al., "Extensible Authentication Protocol (EAP) Key Management Framework", RFC 5247, Network Working Group, Aug. 2008, pp. 1-79.

"3rd Generation Partnership Project; Technical Specification Group Services and System Aspects; Authentication and Key Management for Applications (AKMA) based on 3GPP credentials in the 5G System (5GS) (Release 17)", 3GPP TS 33.535, V17.6.0, Jun. 2022, 25 pages.

"3rd Generation Partnership Project; Technical Specification Group Services and System Aspects; Security architecture and procedures for 5G system (Release 17)", 3GPP TS 33.501, V17.6.0, Jun. 2022, pp. 1-292.

"New solution to KI#1: EAP based PIN deviceauthentication using AKMA", 3GPP TSG-SA3 Meeting #108Adhoc-e, S3-222571, Agenda: 5.10, Nokia, Oct. 10-14, 2022, 2 pages.

"New solution using AKMA", 3GPP TSG-SA3 Meeting #109, S3-223309, Agenda: 5.10, Nokia, Nov. 14-18, 2022, 4 pages.

Extended European Search Report received for corresponding European Patent Application No. 23190075.4, dated Dec. 13, 2023, 7 pages.

Huang et al., "Authentication Mechanisms in the 5G System", Journal of ICT Standardization, vol. 9, No. 2, 2021, pp. 61-78.

"pCR to TS 33.535: Update of the AKMA procedures", 3GPP TSG-SA3 Meeting #98e, S3-200296, Agenda: 3.9, Ericsson, Mar. 2-6, 2020, 4 pages.

Extended European Search Report received for corresponding European Patent Application No. 23190439.2, dated Dec. 20, 2023, 14 pages.

Yang et al., "Formal Analysis of 5G AKMA", International Symposium on Dependable Software Engineering: Theories, Tools, and Applications, Nov. 18, 2021, pp. 102-121.

* cited by examiner

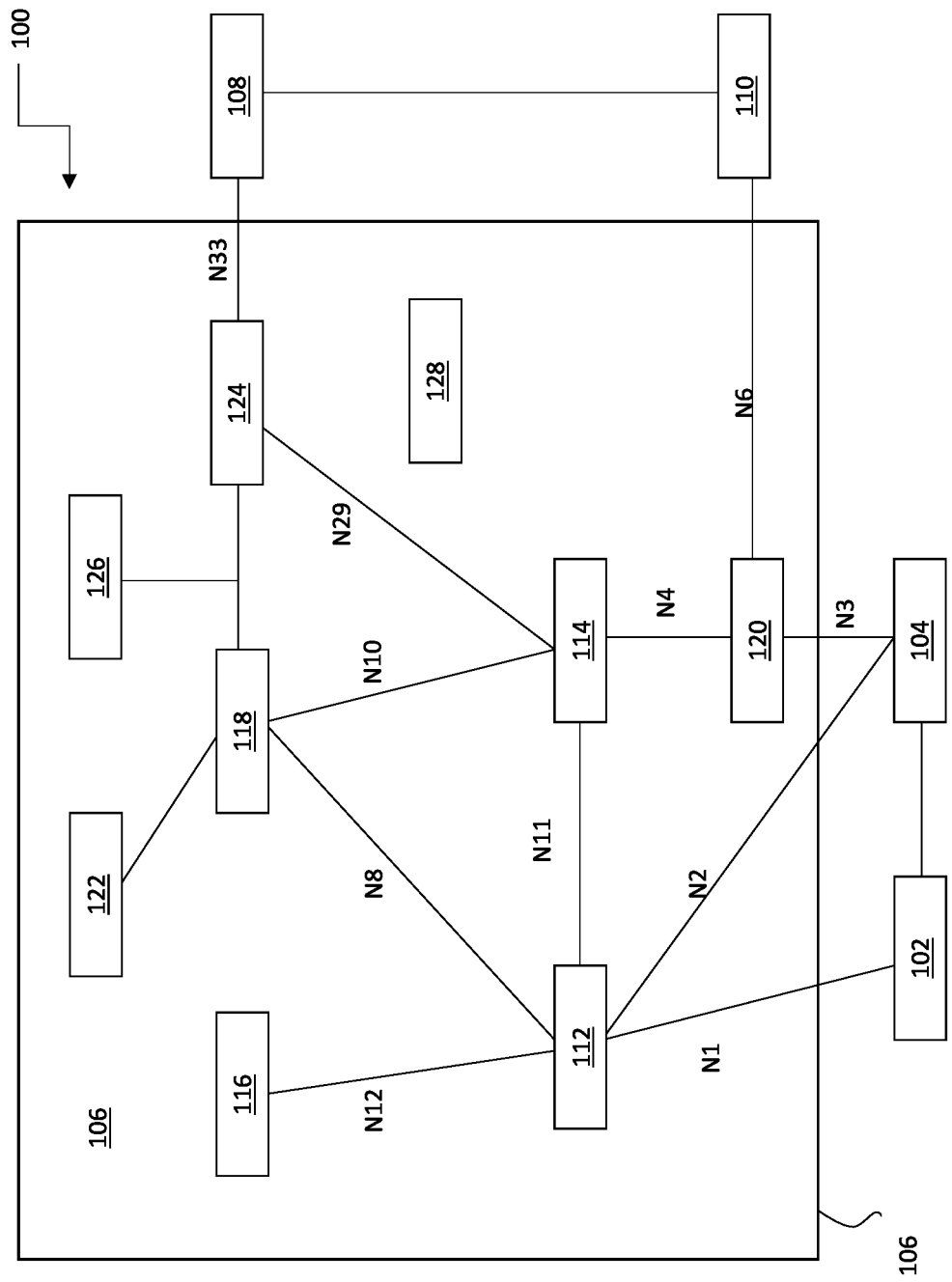

APPARATUS, METHOD, AND COMPUTER PROGRAM

FIELD OF THE DISCLOSURE

The examples described herein generally relate to apparatus, methods, and computer programs, and more particularly (but not exclusively) to apparatus, methods and computer programs for apparatuses.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise Public Land Mobile Networks (PLMN) operating based on radio standards such as those provided by 3GPP, satellite based communication systems and different wireless local networks, for example Wireless Local Area Networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to a first aspect, there is provided a method for a first apparatus, the method comprising: obtaining an identifier of a cryptographic key according to a first security communication protocol; signaling, to a second apparatus, a first authentication request according to a second security communication protocol, the first authentication request comprising the identifier of the cryptographic key and a first verifying information according to a second security communication protocol, wherein the first verifying information comprises a first value calculated using the cryptographic key; receiving, from the second apparatus, an authentication response according to the second security communication protocol, the authentication response comprising a second verifying information according to the second security communication protocol, wherein the second verifying information comprises a second value; and verifying the second apparatus for the second security communication protocol using the second value and the cryptographic key.

The method may comprise receiving a second authentication request from a third apparatus, said second authentication request from the third apparatus triggering said signaling of the first authentication request to the second apparatus.

The method may comprise, subsequent to said verifying, routing communications between the first and third apparatuses.

The method may comprise, prior to signaling the first authentication request to the second apparatus: signaling, to the second apparatus using signaling according to the second security communication protocol, a request to use signaling according to the second security communication to exchange verifying information associated with the first security communication protocol; and receiving, from the second apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus is an Authentication, Authorization, and Accounting server.

According to a second aspect, there is provided a method for a second apparatus, the method comprising: receiving, from a first apparatus, an authentication request according to a second security communication protocol, the authentication request comprising an identifier of a cryptographic key and a first verifying information according to a second security communication protocol, wherein the first verifying information comprises a first value; obtaining the cryptographic key using the identifier of the cryptographic key; verifying the first value using the cryptographic key identified by the identifier of the cryptographic key; deriving a second verifying information according to a second security communication protocol, wherein the second verifying information comprises a second value calculated using the cryptographic key identified by the identifier of the cryptographic key; and signaling to the first apparatus an authentication response that comprises at least the second verification information.

Obtaining the cryptographic key may comprise: providing the identifier of the cryptographic key with a request for said cryptographic key to a key storage server configured to operate according to the first security communication protocol; and receiving, from the key storage server, the cryptographic key corresponding to the identifier of the cryptographic key.

The method may comprise using the cryptographic key to verify said first value prior to using the received cryptographic key to derive the second verifying information.

The method may comprise prior to receiving the authentication request: receiving, from the first apparatus using signaling according to the second security communication protocol, a request to use signaling according to the second security communication to exchange verifying information according to the first security communication protocol; and signaling, to the first apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus may be an Authentication, Authorization, and Accounting server.

According to a third aspect, there is provided a first apparatus, the first apparatus comprising means for: obtaining an identifier of a cryptographic key according to a first security communication protocol; signaling, to a second apparatus, a first authentication request according to a second security communication protocol, the first authentication request comprising the identifier of the cryptographic key and a first verifying information according to a second security communication protocol, wherein the first verifying information comprises a first value calculated using the cryptographic key; receiving, from the second apparatus, an authentication response according to the second security communication protocol, the authentication response comprising a second verifying information according to the second security communication protocol, wherein the second verifying information comprises a second value; and verifying the second apparatus for the second security communication protocol using the second value and the cryptographic key.

The first apparatus may comprise means for receiving a second authentication request from a third apparatus, said second authentication request from the third apparatus triggering said signaling of the first authentication request to the second apparatus.

The first apparatus may comprise means for, subsequent to said verifying, routing communications between the first and third apparatuses.

The first apparatus may comprise means for, prior to signaling the first authentication request to the second apparatus: signaling, to the second apparatus using signaling according to the second security communication protocol, a request to use signaling according to the second security communication to exchange verifying information associated with the first security communication protocol; and receiving, from the second apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus is an Authentication, Authorization, and Accounting server.

According to a fourth aspect, there is provided a second apparatus, the second apparatus comprising means for: receiving, from a first apparatus, an authentication request according to a second security communication protocol, the authentication request comprising an identifier of a cryptographic key and a first verifying information according to a second security communication protocol, wherein the first verifying information comprises a first value; obtaining the cryptographic key using the identifier of the cryptographic key; verifying the first value using the cryptographic key identified by the identifier of the cryptographic key; deriving a second verifying information according to a second security communication protocol, wherein the second verifying information comprises a second value calculated using the cryptographic key identified by the identifier of the cryptographic key; and signaling to the first apparatus an authentication response that comprises at least the second verification information.

The means for obtaining the cryptographic key may comprise means for: providing the identifier of the cryptographic key with a request for said cryptographic key to a key storage server configured to operate according to the first security communication protocol; and receiving, from the key storage server, the cryptographic key corresponding to the identifier of the cryptographic key.

The second apparatus may comprise means for using the cryptographic key to verify said first value prior to using the received cryptographic key to derive the second verifying information.

The second apparatus may comprise means for, prior to receiving the authentication request: receiving, from the first apparatus using signaling according to the second security communication protocol, a request to use signaling according to the second security communication to exchange verifying information according to the first security communication protocol; and signaling, to the first apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus may be an Authentication, Authorization, and Accounting server.

According to a fifth aspect, there is provided a first apparatus, the first apparatus comprising: at least one processor; and at least one memory storing instructions that, when executed by the at least one processor, causes the first apparatus to: obtain an identifier of a cryptographic key according to a first security communication protocol; signal, to a second apparatus, a first authentication request according to a second security communication protocol, the first authentication request comprising the identifier of the cryptographic key and a first verifying information according to a second security communication protocol, wherein the first verifying information comprises a first value calculated using the cryptographic key; receive, from the second apparatus, an authentication response according to the second security communication protocol, the authentication response comprising a second verifying information according to the second security communication protocol, wherein the second verifying information comprises a second value; and verify the second apparatus for the second security communication protocol using the second value and the cryptographic key.

The first apparatus may be caused to receive a second authentication request from a third apparatus, said second authentication request from the third apparatus triggering said signaling of the first authentication request to the second apparatus.

The first apparatus may be caused to, subsequent to said verifying, route communications between the first and third apparatuses.

The first apparatus may be caused to, prior to signaling the first authentication request to the second apparatus: signal, to the second apparatus using signaling according to the second security communication protocol, a request to use signaling according to the second security communication to exchange verifying information associated with the first security communication protocol; and receive, from the second apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus is an Authentication, Authorization, and Accounting server.

According to a sixth aspect, there is provided a second apparatus, the apparatus comprising: at least one processor; and at least one memory storing instructions that, when executed by the at least one processor, causes the second apparatus to: receive, from a first apparatus, an authentication request according to a second security communication protocol, the authentication request comprising an identifier of a cryptographic key and a first verifying information according to a second security communication protocol, wherein the first verifying information comprises a first value; obtain the cryptographic key using the identifier of the cryptographic key; verify the first value using the cryptographic key identified by the identifier of the cryptographic key; derive a second verifying information according to a second security communication protocol, wherein the second verifying information comprises a second value calculated using the cryptographic key identified by the identifier of the cryptographic key; and signal to the first apparatus an authentication response that comprises at least the second verification information.

The obtaining the cryptographic key may comprise: providing the identifier of the cryptographic key with a request for said cryptographic key to a key storage server configured to operate according to the first security communication protocol; and receiving, from the key storage server, the cryptographic key corresponding to the identifier of the cryptographic key.

The second apparatus may be caused to use the cryptographic key to verify said first value prior to using the received cryptographic key to derive the second verifying information.

The second apparatus may be caused to, prior to receiving the authentication request: receive, from the first apparatus using signaling according to the second security communication protocol, a request to use signaling according to the second security communication to exchange verifying information according to the first security communication protocol; and signal, to the first apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus may be an Authentication, Authorization, and Accounting server.

According to a seventh aspect, there is provided a first apparatus, the apparatus comprising: obtaining circuitry for obtaining an identifier of a cryptographic key according to a first security communication protocol; signaling circuitry for signaling, to a second apparatus, a first authentication request according to a second security communication protocol, the first authentication request comprising the identifier of the cryptographic key and a first verifying information according to a second security communication protocol, wherein the first verifying information comprises a first value calculated using the cryptographic key; receiving circuitry for receiving, from the second apparatus, an authentication response according to the second security communication protocol, the authentication response comprising a second verifying information according to the second security communication protocol, wherein the second verifying information comprises a second value; and verifying circuitry for verifying the second apparatus for the second security communication protocol using the second value and the cryptographic key.

The apparatus may comprise receiving circuitry for receiving a second authentication request from a third apparatus, said second authentication request from the third apparatus triggering said signaling of the first authentication request to the second apparatus.

The apparatus may comprise routing circuitry for, subsequent to said verifying, routing communications between the first and third apparatuses.

The apparatus may comprise, prior to signaling the first authentication request to the second apparatus: signaling circuitry for signaling, to the second apparatus using signaling according to the second security communication protocol, a request to use signaling according to the second security communication to exchange verifying information associated with the first security communication protocol; and receiving circuitry for receiving, from the second apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus is an Authentication, Authorization, and Accounting server.

According to an eighth aspect, there is provided a second apparatus, the apparatus comprising: receiving circuitry for receiving, from a first apparatus, an authentication request according to a second security communication protocol, the authentication request comprising an identifier of a cryptographic key and a first verifying information according to a second security communication protocol, wherein the first verifying information comprises a first value; obtaining circuitry for obtaining the cryptographic key using the identifier of the cryptographic key; verifying circuitry for verifying the first value using the cryptographic key identified by the identifier of the cryptographic key; deriving circuitry for deriving a second verifying information according to a second security communication protocol, wherein the second verifying information comprises a second value calculated using the cryptographic key identified by the identifier of the cryptographic key; and signaling circuitry for signaling to the first apparatus an authentication response that comprises at least the second verification information.

The obtaining circuitry for obtaining the cryptographic key may comprise: providing circuitry for providing the identifier of the cryptographic key with a request for said cryptographic key to a key storage server configured to operate according to the first security communication protocol; and receiving circuitry for receiving, from the key storage server, the cryptographic key corresponding to the identifier of the cryptographic key.

The apparatus may comprise using circuitry for using the cryptographic key to verify said first value prior to using the received cryptographic key to derive the second verifying information.

The apparatus may comprise, prior to receiving the authentication request: receiving circuitry for receiving, from the first apparatus using signaling according to the second security communication protocol, a request to use signaling according to the second security communication to exchange verifying information according to the first security communication protocol; and signaling circuitry for signaling, to the first apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus may be an Authentication, Authorization, and Accounting server.

According to a ninth aspect, there is provided non-transitory computer readable medium comprising program instructions for causing a first apparatus to perform at least the following: obtain an identifier of a cryptographic key according to a first security communication protocol; signal, to a second apparatus, a first authentication request according to a second security communication protocol, the first authentication request comprising the identifier of the cryptographic key and a first verifying information according to a second security communication protocol, wherein the first verifying information comprises a first value calculated using the cryptographic key; receive, from the second apparatus, an authentication response according to the second security communication protocol, the authentication response comprising a second verifying information according to the second security communication protocol, wherein the second verifying information comprises a second value; and verify the second apparatus for the second security communication protocol using the second value and the cryptographic key.

The first apparatus may be caused to receive a second authentication request from a third apparatus, said second authentication request from the third apparatus triggering said signaling of the first authentication request to the second apparatus.

The first apparatus may be caused to, subsequent to said verifying, route communications between the first and third apparatuses.

The first apparatus may be caused to, prior to signaling the first authentication request to the second apparatus: signal, to the second apparatus using signaling according to the second security communication protocol, a request to use signaling according to the second security communication to exchange verifying information associated with the first security communication protocol; and receive, from the second apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus is an Authentication, Authorization, and Accounting server.

According to a tenth aspect, there is provided non-transitory computer readable medium comprising program instructions for causing a second apparatus to perform at least the following: receive, from a first apparatus, an authentication request according to a second security communication protocol, the authentication request comprising an identifier of a cryptographic key and a first verifying information according to a second security communication protocol, wherein the first verifying information comprises a first value; obtain the cryptographic key using the identifier of the cryptographic key; verify the first value using the cryptographic key identified by the identifier of the cryptographic key; derive a second verifying information according to a second security communication protocol, wherein the second verifying information comprises a second value calculated using the cryptographic key identified by the identifier of the cryptographic key; and signal to the first apparatus an authentication response that comprises at least the second verification information.

The obtaining the cryptographic key may comprise: providing the identifier of the cryptographic key with a request for said cryptographic key to a key storage server configured to operate according to the first security communication protocol; and receiving, from the key storage server, the cryptographic key corresponding to the identifier of the cryptographic key.

The second apparatus may be caused to use the cryptographic key to verify said first value prior to using the received cryptographic key to derive the second verifying information.

The second apparatus may be caused to, prior to receiving the authentication request: receive, from the first apparatus using signaling according to the second security communication protocol, a request to use signaling according to the second security communication to exchange verifying information according to the first security communication protocol; and signal, to the first apparatus using signaling according to the second communication protocol, an acceptance of said request to use said signaling according to the second security communication to exchange verifying information associated with the first security communication protocol.

The first security communication protocol may be an Authentication and Key Management for Applications protocol, and the second security communication protocol may be an Internet Protocol-based security communication protocol.

The Internet Protocol-based security communication protocol may be at least one of: a Remote Authentication Dial-In User Service protocol, or an Internet Key Exchange protocol, and an Internet Protocol Security protocol.

The first apparatus may be a Personal Internet of Things network element with gateway capability, and the second apparatus may be an Authentication, Authorization, and Accounting server.

According to an eleventh aspect, there is provided a computer program product stored on a medium that may cause an apparatus to perform any method as described herein.

According to a twelfth aspect, there is provided an electronic device that may comprise apparatus as described herein.

According to a thirteenth aspect, there is provided a chipset that may comprise an apparatus as described herein.

BRIEF DESCRIPTION OF FIGURES

Some examples, will now be described, merely by way of illustration only, with reference to the accompanying drawings in which:

FIGS. 1A and 1B show a schematic representation of a 5G system;

DETAILED DESCRIPTION

Figure 1B:
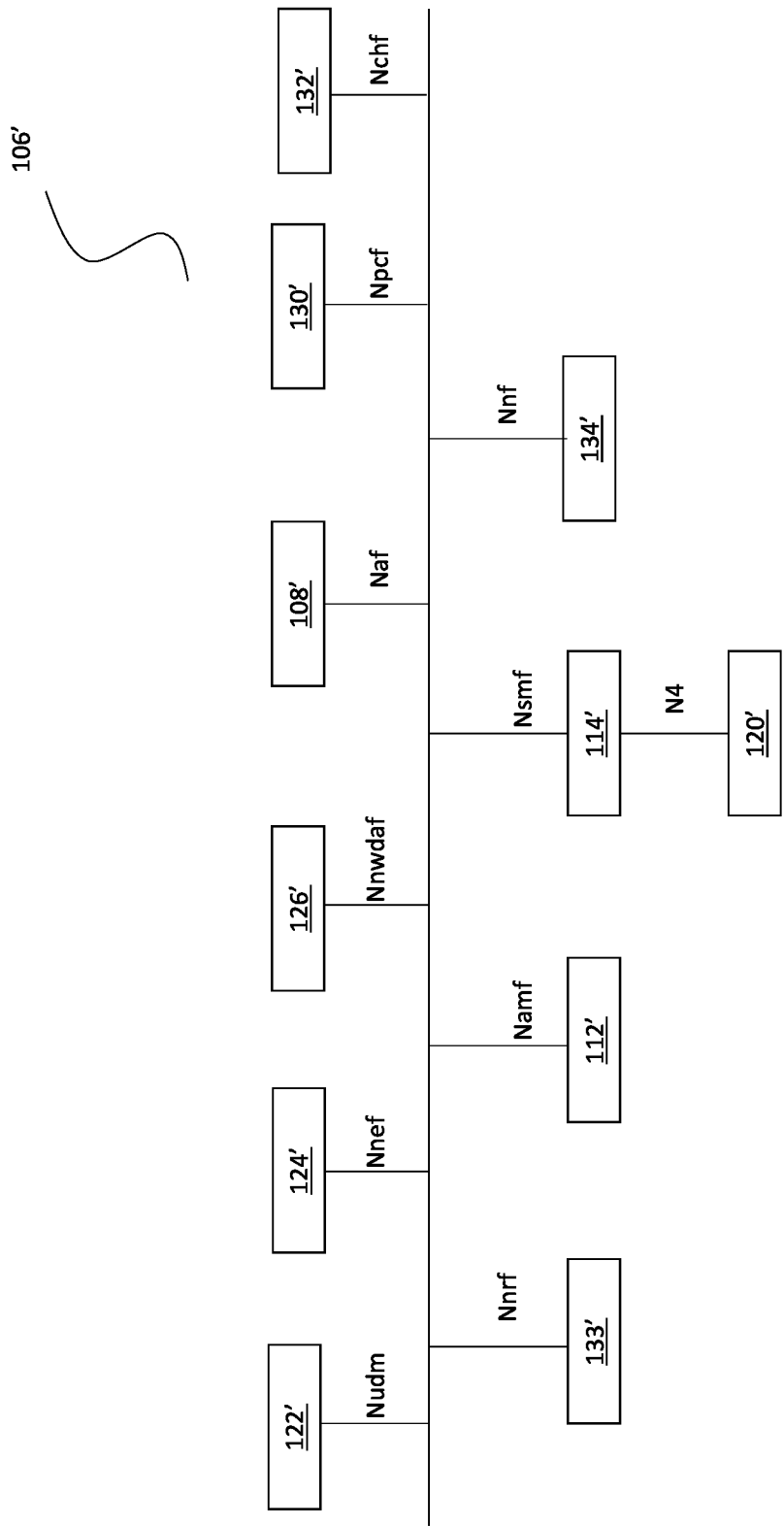

In the following description of examples, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems (for example, current 6G proposals).

Before describing in detail the examples, certain general principles of a 5G wireless communication system are briefly explained with reference to FIGS. 1A and 1B.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party entity. Although NRF 128 is not depicted with its interfaces, it is understood that this is for clarity reasons and that NRF 128 may have a plurality of interfaces with other network functions.

The 5GC 106 also comprises a Network Data Analytics Function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer for a network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

FIG. 1B shows a schematic representation of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

3GPP refers to a group of organizations that develop and release different standardized communication protocols. 3GPP develops and publishes documents pertaining to a system of "Releases" (e.g., Release 15, Release 16, and beyond).

Personal Internet of Things (IoT) Network (PIN) is a concept, which is currently being studied in 3GPP.

A PIN comprises a group of PIN Elements (PINEs) that are able to communicate with each other directly or via at least one relay PIN Element that has a Gateway Capability (i.e., PEGC).

The protocol used by the PINEs is defined outside of 3GPP (for example, Wi-Fi Alliance, and the Connectivity Standards Alliance define various aspects of the protocol used by PINEs). The PEGC comprises a UE and can use the UE to connect to a 5G (or similar) network. The PEGC can exchange data with the 5G network and can relay data between the PINEs and the network.

Security for a PIN can be established efficiently using a centralized Authentication, Authorization and Accounting (AAA) server. The AAA server may use the Extensible Authentication Protocol (EAP) for authentication purposes. The EAP is an authentication framework protocol for wireless networks that expands the authentication methods used by the Point-to-Point Protocol (PPP). EAP is currently defined in RFC 3748, and is updated by RFC 5247.

Secure PINs use secure wireless links between PINEs and PEGCs. The security protocol used for these secure wireless links may depend on the overall communication protocol within the PIN. Independently of the specific security protocol used, credentials are established between a PINE and a PEGC that allow mutual authentication as the basis of establishing secure communication.

In use cases restricted to only a few PINEs, credential provisioning may be done by a user of the PIN configuring a passphrase on the PEGC and PINE (potentially using techniques that ease the configuring of the passphrase on the PINE, such as wireless protected setup in Wi-Fi networks).

However, in use cases with multiple PEGCs and/or large numbers of PINEs, which generally have frequent additions and/or removals of PINEs, more automated procedures are required, and a passphrase shared by all PINEs is better avoided. In particular, rather than configuring credentials for PINEs on multiple PEGCs, the credentials may usefully be configured on a central AAA server. The EAP framework may then be used to authenticate PINEs and establish a key (called a Master Session Key (MSK) in the EAP framework) that is shared between a specific PINE and the PEGC.

As an example, this concept may be used by Enterprise Wi-Fi Protected Access specified by the Wi-Fi Alliance).

An owner of a PINE may want to deploy the AAA server on centralized resources, e.g. in a cloud. In such a case, secure channels may be established between the PEGCs and the AAA server, the secure channels being used to transmit the authentication messages and to send the MSK from the AAA server to the PEGC.

An example architecture of such a system is illustrated with reference to FIG. 6.

Figure 6:
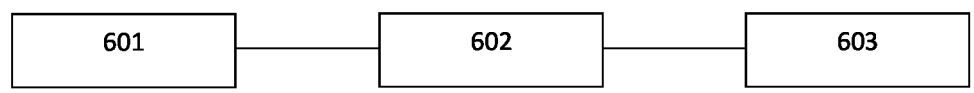
FIGS. 6 to 10 illustrate example architecture.

FIG. 6 illustrates a PINE 601 that functions as an EAP client to PEGC 602 (which is configured to operate as an EAP Authenticator). The PEGC 602 further interacts with a AAA server 603, which is configured to operate as an EAP server.

In this example of FIG. 6, the communication between the PEGC 602 and the AAA server 603 may be executed over the user plane (e.g., a 5G user plane). This means that communications between the PEGC 602 and the AAA server may be performed using a Protocol Data Unit (PDU) session established by the UE of the PEGC.

It is also possible to use the Authentication and Key Management for Applications (AKMA) protocol to establish security between a PEGC and a AAA server. The AKMA protocol is a cellular-network-based delegated authentication service that is currently specified in 3GPP TS 33.535.

In AKMA, an identity provider (IdP), (such as, for example, a home network in which a user equipment is subscribed), authenticates a UE. This authentication is the regular mutual authentication of 5G network between the UE and its' home network, which is known as 5G Authentication and Key Agreement Protocol (5G AKA). During the 5G AKA, both the UE and the home network compute keys Cipher Key (CK) and Integrity Key (IK) from a permanent long term key, K. In particular, the UE and home network may independently derive a key, $K_{AUSF}$, from CK and IK. Later, more keys may be derived from $K_{AUSF}$ to protect the confidentiality and integrity of the user's cellular-network data. If the user's subscription has AKMA service enabled, then both the UE and the home network may compute a key, $K_{AKMA}$, and its AKMA Key identifier, A-KID, from the key, $K_{AUSF}$.

When a user tries to log into an AF, the user equipment sends the key identifier A-KID to the application function and computes an AF-specific cryptographic key, $K_{AF}$, from the key $K_{AKMA}$ and the application function's identity (AF-ID). The home network may authenticate and authorise the application function by computing and providing the application-specific key $K_{AF}$ to the application function once the application function has been authenticated.

There may be a secure interaction between AAA server and 5G (or similar, e.g., 6G) network that allows the 5G network to authenticate the AAA server and authorize it to receive an AKMA key to be shared with the PEGC, based on user consent. However, it is not currently defined how this AKMA key may be used to establish secure Remote Authentication Dial-In User Service (RADIUS) or Diameter communication. In other words, it is not defined how RADIUS or Diameter protocols may be used as part of the AKMA Ua* protocol (where Ua* represents a reference point between a UE and an application function, such as described in TS 33.535, clause 4.5). While RADIUS has its own—however weak—security mechanism, Diameter is currently secured using Internet Protocol Security (IPsec). This means that the Ua* protocol comprises Internet Key Exchange (IKE)/IPsec and Diameter on top of it.

RADIUS is described in the following RFCs:

RFC 2865 Remote Authentication Dial In User Service (RADIUS): Includes concept of Request Authenticator and Response Authenticator and Password hiding using RADIUS shared secret.

RFC 3579 RADIUS (Remote Authentication Dial In User Service) Support For Extensible Authentication Protocol (EAP): Includes concept of Message Authenticator RFC 2548 Microsoft Vendor-specific RADIUS Attributes: Defines MS-MPPE-Send-Key, S-MPPE-Recv-Key, which are used to transfer the MSK from EAP server to EAP authenticator in an encrypted way that uses a shared secret.

IPsec/IKE version 2 is described in RFC 7296 Internet Key Exchange Protocol Version 2 (IKEv2).

AKMA authentication is described in 3GPP TS 33.535, and illustrated below with reference to FIG. 7.

Figure 7:
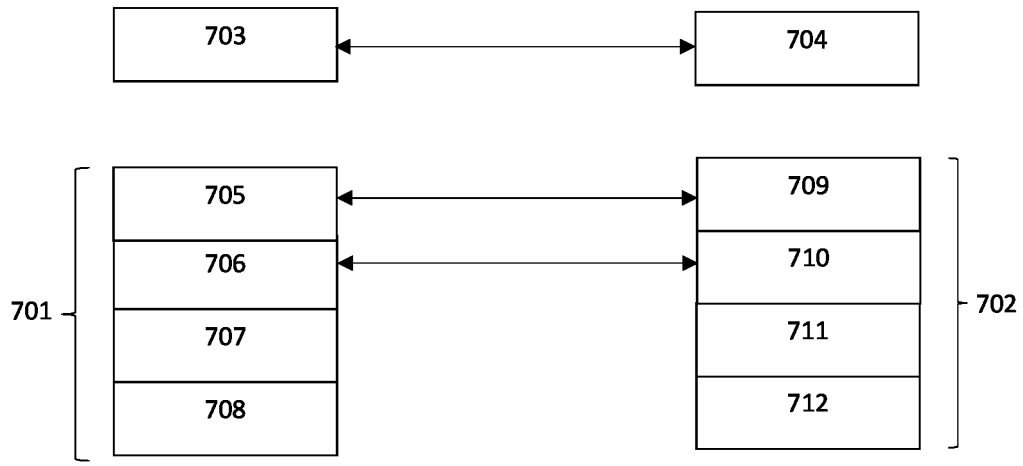

FIG. 7 illustrates a first protocol stack 701 associated with a user equipment 703, and a second protocol stack 702 associated with an application function 704. The user equipment 703 and the application function 704 communicate via a Ua* interface.

The first protocol stack 701 comprises a first Hyper Text Transfer Protocol (HTTP) layer 705, a first Transport Layer Security (TLS) layer 706, a first transmission control protocol layer 707, and a first lower layer 708 (comprising, for example, a first physical layer and a first medium access control (MAC) layer).

The second protocol stack 702 comprises a second HTTP layer 709, a second TLS layer 710, a second transmission control protocol layer 711, and a second lower layer 712 (comprising, for example, a second physical layer and a second medium access control (MAC) layer).

The first and second HTTP layers may communicate with each other via a HTTP protocol. The first and second TLS layers may communicate with each other via a TLS tunnel.

The AKMA features and mechanisms were developed to support authentication and key management aspects for applications based on subscription credentials in a 5G system (and may apply to later Generations of 3GPP networks). 3GPP TS 33.535 specifies profiles only for TLS-based Ua* protocols.

Prior to AKMA being implemented in 3GPP, the General Bootstrapping Architecture (GBA) protocol (defined in 3GPP TS 33.222) served a similar purpose as AKMA.

As mentioned above, as PEGC acts as an EAP authenticator for EAP authentication between PIN element and AAA-server for the PIN, AKMA can be used to establish a key shared between PEGC and AAA-server. However, AKMA currently does not support the use of RADIUS or Diameter over IPsec for transporting EAP messages.

Therefore, it would be useful to extend the AKMA specification, which currently only supports HTTP digest and TLS profile (AKMA procedures defined in 3GPP TS 33.535), to support RADIUS and IPSec profiles as well.

To address at least one of the above issues, the following proposes to provide and use new AKMA profiles that support the use of RADIUS and IPSec. The presently described techniques and architecture may be particularly useful for 3GPP PIN architecture in which a gateway element with integrated UE may act as an EAP authenticator during authentication of PIN elements. For example, with the help of the newly defined profiles, a gateway element may securely connect to AAA servers using the 5G AKMA mechanism.

Figure 8:
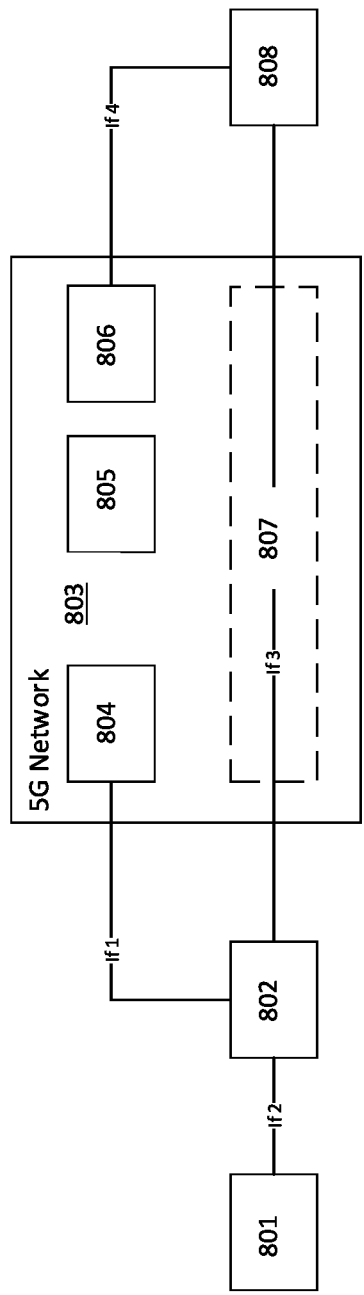

FIG. 8 provides an example architecture in which the presently described techniques may be implemented.

FIG. 8 illustrates a PINE 801 configured to communicate with a PEGC 802 over an Interface If2. The PEGC 802 may communicate with a 5G network 803 comprising an AUSF 804, and AKMA Anchor Function (AAnF) 805, an NEF 806, and a UPF 807. The PEGC 802 may communicate with AUSF 804 over an interface If1. The PEGC 802 may communicate with an AAA server 808 through UPF 807 using an interface IF3. The AAA server 808 may communicate with the NEF 806 using an interface If4.

The If1 Interface may be used by the UE of the PEGC 802 to execute primary authentication during network registration.

The If2 Interface may be used by PINE 801 and PEGC 802 to exchange messages. It is assumed that these messages comprise at least EAP messages (i.e., messages in accordance with the EAP protocol), which are used for authentication, when the PINE 801 connects to the PEGC 802.

The If3 Interface between the PEGC 802 and the AAA server 808 may be used to exchange messages related to the authentication and authorization of a PINE 801. This If3 interface may be based on the IP protocol and use the User Plane functionality of the PEGC's UE and the UPF of the 5G network.

The If4 Interface is a network exposure interface of the 5G network, which allows the AAA server 808 to act as an 5G AF and to make use of the AKMA capabilities of the 5G network.

According to the present disclosure, there are provided AKMA profiles that enable a secure exchange of messages related to the authentication and authorization of a PINE. Depending on the protocol used for the exchange of the authentication and authorization messages between PEGC and AAA, different variants of the AKMA profile may be used.

A first example AKMA form will be discussed with reference to the RADIUS protocol.

In this first example, the message exchange between the PEGC and the AAA server is executed using the RADIUS protocol. In other words, RADIUS messages are exchanged between a PEGC and AAA server directly as Internet Protocol/User Datagram Protocol (IP/UDP) datagrams.

Figure 9:
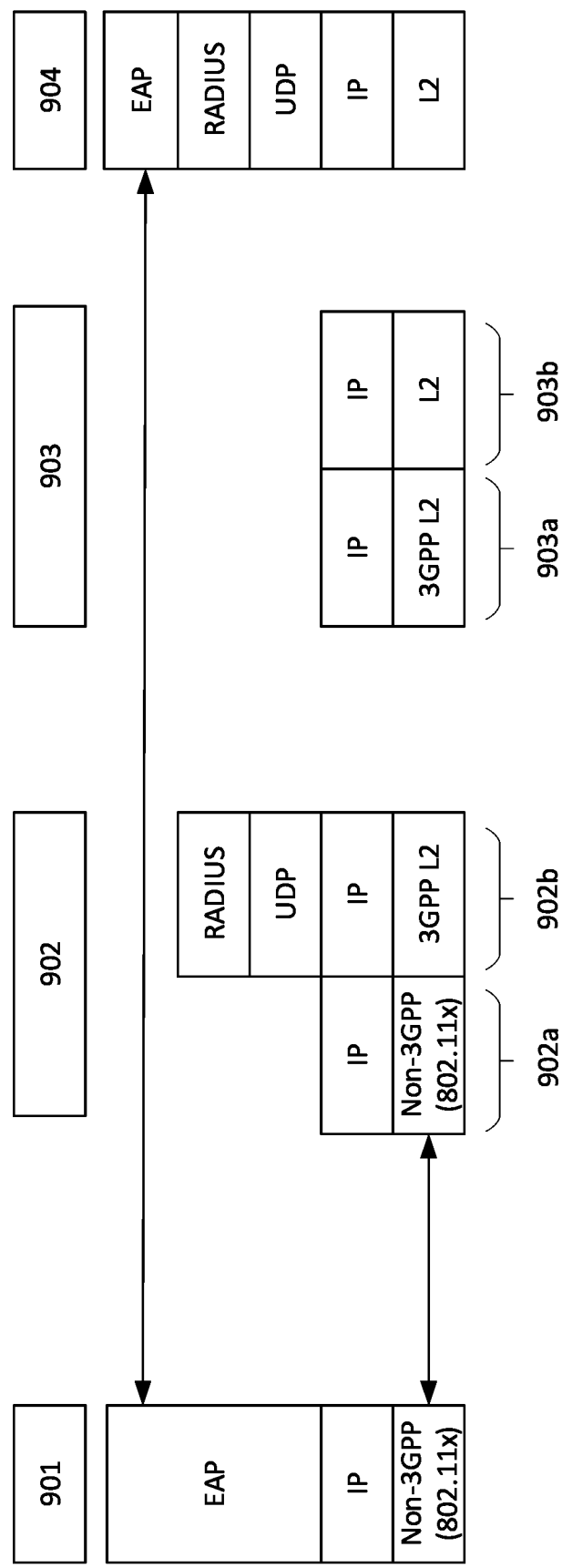

This example is illustrated with respect to FIG. 9, which illustrates example different protocol stacks employed at the different entities.

FIG. 9 illustrates respective protocol stacks associated with a PINE 901, a PEGC 902, a 5GS 903, and a AAA server 904.

The PINE 901 protocol stack comprises an Extensible Authentication Protocol (EAP) protocol layer that is located above an IP layer, which is, in turn, located above a non-3GPP network layer (for example, above an 802.11x layer).

The PEGC 902 comprises a first protocol stack 902a for interacting with the PINE 901, and a second protocol stack 902b for interacting with the 5GS. The first PEGC protocol stack comprises an IP layer located above a non-3GPP network layer. The second PEGC protocol stack comprises a RADIUS layer located above a UDP layer, which is located above an IP layer and a 3GPP network layer (i.e., layer 2).

The 5GS 903 comprises a first protocol stack 903a for interacting with the PEGC 902, and a second protocol stack 903b for interacting with the AAA server 904. The first 5GS protocol stack comprises an IP layer located above a 3GPP network layer. The second 5GS protocol layer comprises an IP layer located above a network layer.

The AAA server 904 comprises a protocol stack comprising an EAP protocol layer located above a RADIUS protocol layer, which is located above a UDP layer, which is located above an IP layer and a network layer.

In this example, RADIUS is supported between PEGC 902 and AAA-server 904. EAP-based authentication is supported between PINE and the AAA server 904.

Figure 11:
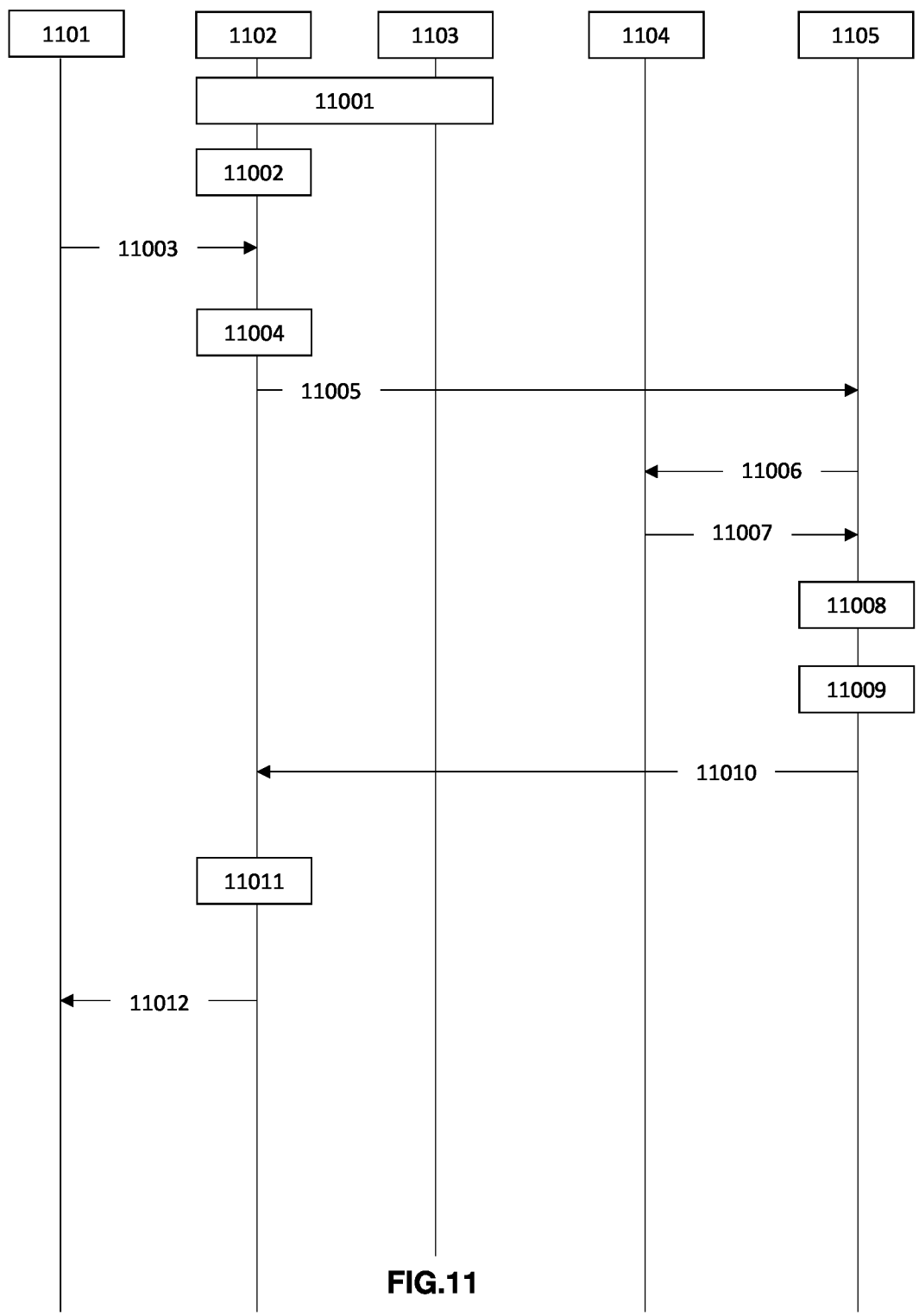
FIGS. 11 and 12 illustrate example signaling that may be performed by apparatus described herein.

Example signaling for this architecture of FIG. 9 is illustrated with respect to FIG. 11. In other words, FIG. 11 illustrates PEGC acting as an EAP Authenticator, and the AAA server acting as a RADIUS server towards the PEGC and as an AKMA AF towards an AKMA Anchor Function (AAnF)/Network Exposure Function (NEF) (access to the AAnF may be provided via the NEF).

FIG. 11 illustrates examples signaling between a PINE 1101, a PEGC 1102, an Authentication Server Function (AUSF) 1103, an AAnF/NEF 1104, and an AAA 1105.

During 11001, the PEGC 1102 and AUSF 1103 exchange signaling for executing a primary authentication therebetween. Primary authentication may refer to the PEGC 1102 registering as a UE with the 5GS comprising the AUSF 1103. This may be in accordance with 3GPP TS 33.501 (clauses 6.1.2 and 6.1.3). This registration may comprise the PEGC 1102, acting as a UE, sending a register request to the 5GS, and the 5GS triggering primary authentication as part of the registration procedure.

During 11002, the PEGC 1102 calculates A-KID and $K_{AF}$. $K_{AF}$ is a key that can be used for protection of all subsequent RADIUS messages sent to the AAA server 1105. In other words, under the AKMA architecture described above, the AAA server 1105 may be considered to be the Application Function.

Aside from 11006 to 11007, 11003 to 11011 may be repeated a plurality of times in order to complete an authentication flow. 11006 to 11007 may be performed only when the AAA server 1105 is not in possession of a $K_{AF}$ key.

During 11003, the PINE 1101 signals the PEGC 1102. This signaling of 11003 may be any message or event that triggers the PEGC 1102 to send a RADIUS message to the AAA server 1105 during 11005. For example, this signaling of 11003 may comprise an EAP message that triggers the sending of 11005.

During 11004, the PEGC 1102 determines to generate a RADIUS message that comprises an A-KID. The RADIUS message may be, for example, a RADIUS Access-Request. This RADIUS message may comprise information received from the PINE 1101 (for example, the received EAP frame of 11003 when this forms the trigger). The PEGC 1102 may calculate a Message Authenticator (MAC) value (as defined in RFC 3579) using $K_{AF}$ as RADIUS secret.

If the RADIUS message of 11004 comprises an attribute that is to be hidden, (such as, for example, a password), the attribute may be encrypted using $K_{AF}$ used as the shared secret (e.g., as described in RFC 2865).

During 11005, the PEGC 1102 signals the AAA server 1105. This signaling may comprise the protected RADIUS message generated during 11004.

As mentioned above, 11006 and 11007 may be performed only when the AAA server 1105 does not comprise the $K_{AF}$.

During 11006, the AAA server 1105, in response to detecting the A-KID attribute in the signaling of 11005, signals the AAnF/NEF 1104. This signaling of 11006 may comprise a request for the $K_{AF}$. This signaling of 11006 may comprise the A-KID.

During 11007, the AAnF authorizes the request of 11006 and returns the requested $K_{AF}$ to the AAA server 1105 in response to the signaling of 11006. The signaling of 11007 may comprise an identity of the PEGC 1102 (e.g. the Generic Public Subscription Identifier (GPSI)).

When the AAA server 1105 has the $K_{AF}$, during 11008 the AAA server generates an expected MAC value using the $K_{AF}$ and compares the generated MAC value with the received MAC value. Furthermore, the AAA server authorizes the PEGC based on any identity of the PEGC 1102 received during 11006.

During 11009, the AAA server generates a RADIUS message. This RADIUS message may be a response to the signaling of 11005. For example, the message generated may be a RADIUS Access-Accept or RADIUS Access-Challenge.

Message Authenticator and Response Authenticator may be calculated by the AAA server 1105, and added to the message of 11008 (such as defined in RFC 3579 and RFC 2865, with $K_{AF}$ being used as the shared secret).

When the final RADIUS Access-Accept message generated during 11008 comprises a master session key, this key may be transferred and encrypted using MS-MPPE-Send-Key, MS-MPPE-Recv-Key attributes as defined in RFC 2548, with $K_{AF}$ used as the shared secret.

During 11010, the AAA server 1105 sends the message generated during 11009 to the PEGC 1102. This message may be encrypted using $K_{AF}$.

During 11011, the PEGC 1102 verifies and decrypts the received message of 11010 using $K_{AF}$.

During 11012, the PEGC 1102 signals the PINE 1101. This signaling may be performed when the received signaling of 11011 causes the forwarding an EAP message to the PINE 1101.

In a variant of this procedure of FIG. 11, the A-KID attribute may only be present in the first RADIUS Access-Request message. In this case, when the AAA server has received the $K_{AF}$ for this A-KID, the AAA server may map the $K_{AF}$ as the shared secret to the IP address of the RADIUS message. In subsequent RADIUS messages the AAA server may select the shared secret based on the IP address of the packet, for example, as described in RFC 2865.

A second example AKMA form will be discussed with reference to the Internet Protocol Security (IPSec) protocol.

In this second example, the authentication and authorization messages are transferred within an IPSec tunnel, which is established using IKEv2 prior to the exchange of the authentication and authorization messages. Within an IPSec tunnel, the authentication and authorization messages can be transferred using another protocol, such as using the RADIUS protocol or the Diameter protocol. It is understood that although the following example uses 5G AKMA capabilities for the establishment of IPSec tunnels using an exchange of RADIUS or Diameter messages, other protocols may be used for exchanging these messages.

Figure 10:
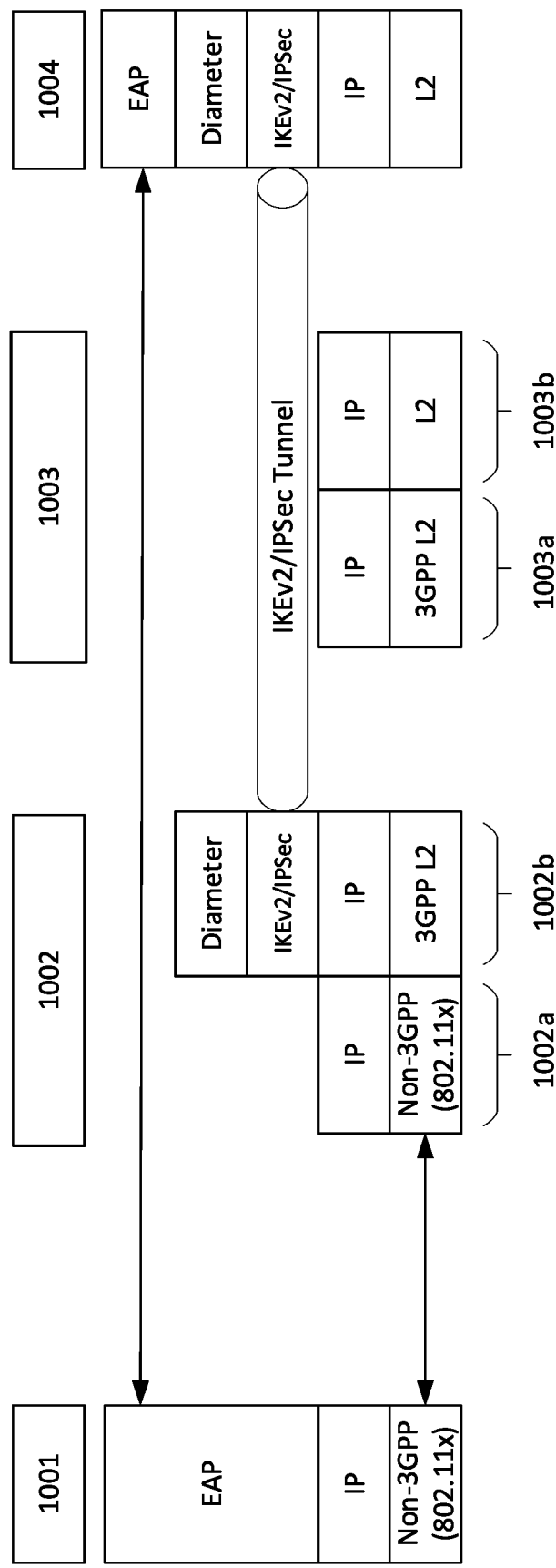

This second example is illustrated with respect to FIG. 10, which shows which illustrates example different protocol stacks employed at the different entities.

FIG. 10 illustrates respective protocol stacks associated with a PINE 1001, a PEGC 1002, a 5GS 1003, and a AAA server 1004.

The PINE 1001 protocol stack comprises an EAP protocol layer that is located above an IP layer, which is, in turn, located above a non-3GPP network layer (for example, above an 802.11x layer).

The PEGC 1002 comprises a first protocol stack 1002a for interacting with the PINE 1001, and a second protocol stack 1002b for interacting with the 5GS. The first PEGC protocol stack comprises an IP layer located above a non-3GPP network layer. The second PEGC protocol stack comprises a Diameter layer protocol located above an IKEv2/IPSec layer, which is located above an IP layer and a 3GPP network layer (i.e., layer 2).

The 5GS 1003 comprises a first protocol stack 1003a for interacting with the PEGC 1002, and a second protocol stack 1003b for interacting with the AAA server 1004. The first 5GS protocol stack comprises an IP layer located above a 3GPP network layer. The second 5GS protocol layer comprises an IP layer located above a network layer.

The AAA server 1004 comprises a protocol stack comprising an EAP protocol layer located above a Diameter protocol layer, which is located above an IKEv2/IPSec layer, which is located above an IP layer and a network layer.

In this example, the PEGC 1002 and AAA server 1004 establish an IKEv2/IPSec tunnel. EAP based authentication is supported between PINE and AAA server over Diameter over IPsec.

As an aside, it is noted that Diameter does not define any security mechanisms of its own. Thus, Diameter may operate in combination with a protocol providing secure connection between the peers (such as, for example, by IPsec). On the contrary, the RADIUS protocol specifications defines security mechanisms therein. However, depending on the overall deployment scenario RADIUS security might not be sufficient. In these cases, RADIUS might be deployed in combination with a protocol providing stronger security mechanisms, such as, for example, IPSec.

Figure 12:
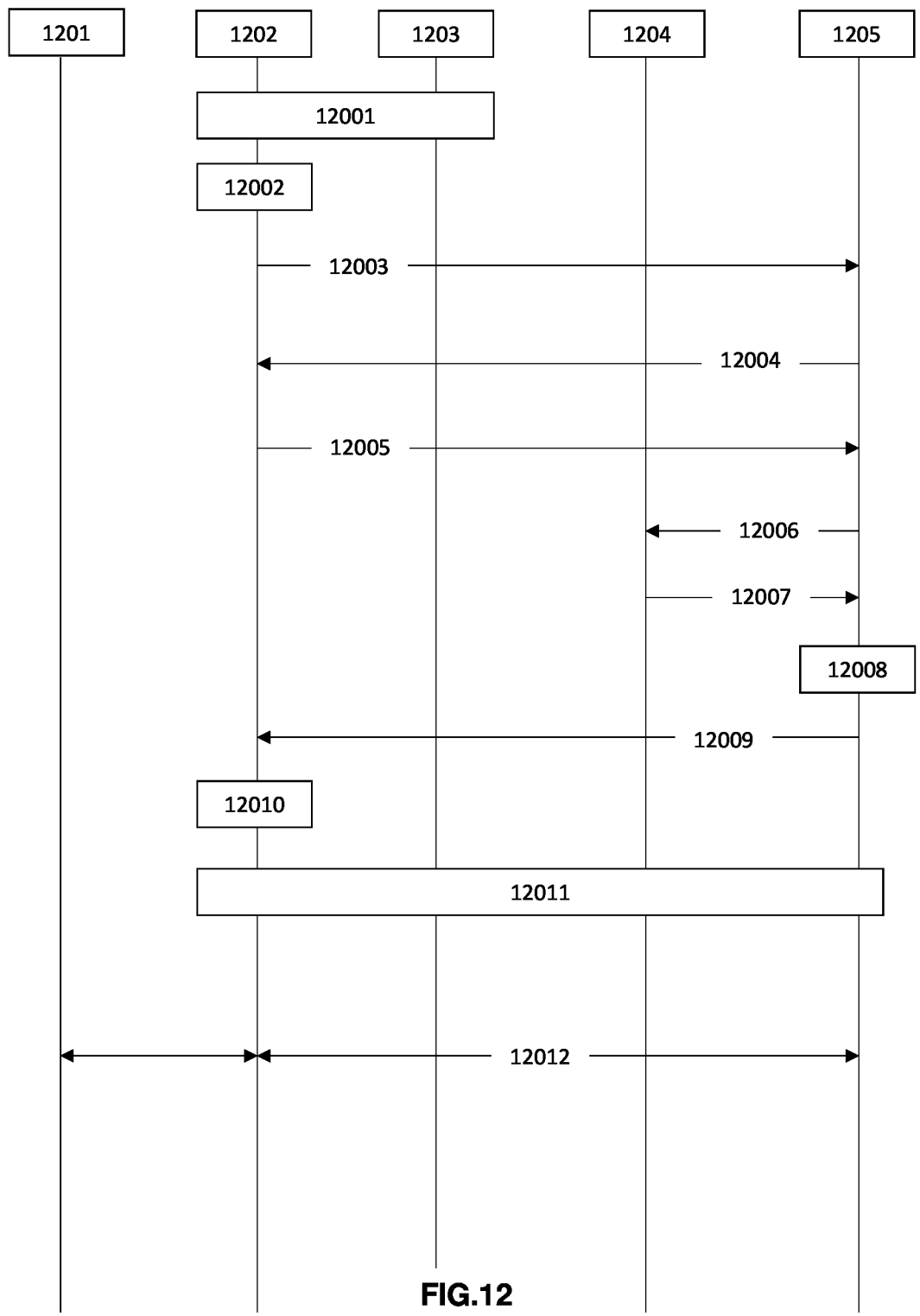

FIG. 12 illustrates signaling that may be performed between a PINE 1201, a PEGC 1202, an AUSF 1203, an AAnf/NEF 1204, and an AAA server 1205. In this example of FIG. 12, the PEGC 1202 acts as an EAP authenticator and IKE initiator. Further, in this example of FIG. 12, the AAA server act as an EAP server towards the PINE 1201, as an IKE responder towards PEGC 1202, and as an AF towards the 5G system.

During 12001, the PEGC 1202 and the AUSF 1203 perform a primary authentication to develop a trust relationship therebetween.

During 12002, the PEGC 1202 generates an AKMA Anchor key ($K_{AKMA}$) and A-KID following the successful primary authentication of 12002. If primary authentication were not successful during 12001, steps 12002 onwards would not be performed.

12003 to 12011 relate to the performance of an IKEv2-based procedure, and relates to the establishment of an IPSec tunnel using AKMA.

During 12003, the PEGC 1202 signals the AAA server 1205. This signaling of 12003 may be a request to initiate a security association. For example, this signaling of 12003 may comprise an IKE_SA_INIT request service operation for requesting the initiation of a security association according to IKEv2. This signaling of 12003 may comprise an identifier of an ID type "3GPP-AKMA" in the payload. Based on the ID type, the AAA server is aware that the AKMA procedure is to be used for the subsequent authentication steps.

During 12004, the AAA server 1205 signals the PEGC 1202. This signaling of 12004 may comprise a response to the signaling of 12003. For example, this signaling of 12004 may comprise an IKE_SA_INIT response service operation. This signaling of 12004 may indicate that the AAA server 1205 has agreed to establish a tunnel using 3GPP-AKMA as the agreed ID type.

During 12005, the PEGC 1202 signals the AAA sever 1205. This signaling of 12005 may request that authentication be performed. For example, this signaling may comprise an IKE_AUTH_Request service operation. This signaling of 12005 may comprise the A-KID. The A-KID may be indicated as being the Initiator Identifier, Idi. This signaling of 12005 may comprise an indication that the authentication is to be performed using AKMA_AUTH. AKMA_AUTH may be generated with Pseudo Random Function (prf) by using $K_{AF}$ as a shared secret. More particularly, AKMA_AUTH may be generated with Pseudo Random Function (prf) by using $K_{AF}$ as a shared secret and the string "Key Pad for IKEv2" of 17 ASCII character without null termination. This signaling of 1205 corresponds to performing IKE_AUTH exchange without EAP option. This means that the IKE_AUTH_Request may be sent comprising A-KID as initiator ID and a generated AUTH attribute towards AAA server. The AUTH attribute may be calculated using a pseudorandom function (prf) (for example, as described in RFC 5596) with $K_{AF}$ used as shared secret.

During 12006, the AAA server 1205 signals the AAnF/NEF 904. This signaling of 12006 may request that the AAnF/NEF 1204 provides the AAA server 1205 with the key, $K_{AF}$. This signaling if 12006 may comprise the initiator ID, A-KID received during 12005. In other words, during 12006, the AAA Server may use the A-KID to fetch the Key $K_{AF}$ via NEF from AAnF.

Assuming that the AAnF has successfully authorized the request received during 12006, during 12007, the AAnF/NEF responds to the signaling of 12006. This signaling of 12007 may comprise $K_{AF}$. This signaling of 12007 may comprise the identity of the PEGC (e.g. the GPSI).

During 12008, the AAA server 1205 verifies the incoming AKMA_AUTH received during 12005 using $K_{AF}$, and authorizes the PEGC 1202 based on the received identity of the PEGC during 12007 and 12005.

Assuming this verification is successful, during 12009 the AAA server 1205 signals the PEGC 1202. This signaling may be a response to the signaling of 12005. This signaling of 12009 may comprise an IKE_AUTH_Response service operation. This signaling may comprise a calculated AUTH parameter (for example, as defined in RFC) 7296 using $K_{AF}$ as a shared secret. This signaling of 12009 may comprise an identification of the AAA server 1205. For example, this signaling of 12009 may comprise the fully qualified domain name (FQDN) of the AAA server 1205.

During 12010, the PEGC 1202 verifies the received AKMA_AUTH using $K_{AF}$ as the shared secret. When the received AKMA_AUTH is successfully verified, the PEGC 1202 and AAA server 1205 are mutually authenticated.

During 12011, the PEGC 1202 and the AAA server 1205 exchange signaling for establishing a child security association. This may be performed, for example, as specified in RFC 7296.

During 12012, EAP authentication is performed between the AAA server 1205 and the PINE 1201, where EAP messages between the PEGC 1202 and AAA server 1205 are carrier within the Diameter protocol.

It is understood that although the above example uses AKMA for establishing a security association, other mechanisms/protocols may be used. For example, GBA may be used instead of AKMA. In this case, the AAA server may perform the role of the GBA NAF, while the AAnF is replaced by BSF.

Figure 13:
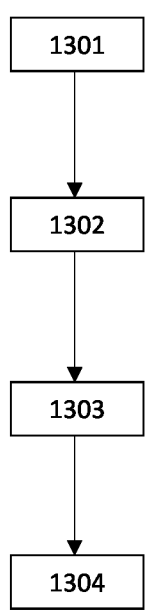
FIGS. 13 and 14 illustrate example operations that may be performed by apparatus described herein.
Figure 14:
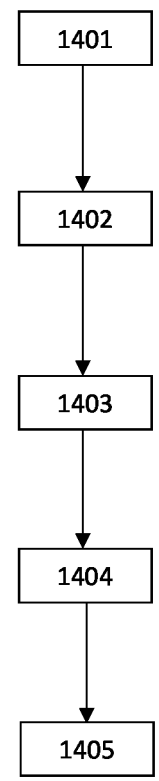

FIGS. 13 and 14 illustrate aspects the may be performed by different apparatus according to the above-described examples. It is therefore understood that features of the above examples may either correspond to features described in connection with FIGS. 13 and/or 14, and/or be integrated therewith.

FIG. 13 illustrates operations that may be performed by a first apparatus. The first apparatus may be a PECG and/or a UE.

During 1301, the first apparatus obtains an identifier of a cryptographic key according to a first security communication protocol. For example, the identifier of the cryptographic key $K_{AF}$ may be obtained by the first apparatus calculating/generating the key itself or by retrieving it from another entity. Similarly, the cryptographic key $K_{AF}$ may be obtained by the first apparatus calculating/generating the key itself or by retrieving it from another entity.

During 1302, the first apparatus signals, to a second apparatus, a first authentication request according to a second security communication protocol, the first authentication request comprising the identifier of the cryptographic key and a first verifying information according to a second security communication protocol, wherein the first verifying information comprises a first value calculated using the cryptographic key. The second apparatus may be as described below in relation to FIG. 14.

During 1303, the first apparatus receives, from the second apparatus, an authentication response according to the second security communication protocol, the authentication response comprising a second verifying information according to the second security communication protocol, wherein the second verifying information comprises a second value.

During 1304, the first apparatus verifies the second apparatus for the second security communication protocol using the second value and the cryptographic key.

For example, when the first protocol is AKMA, the identifier is A-KID and the cryptographic key is $K_{AF}$, the key $K_{AF}$ may be used in the second security protocol (e.g., RADIUS or IKE/IPsec), for calculation and verification of the second "value".

The first apparatus may receive a second authentication request from a third apparatus, said second authentication request from the third apparatus triggering said signaling of the first authentication request to the second apparatus.

The first apparatus may, subsequent to said verifying, route communications between the first and third apparatuses.

The first apparatus may, prior to signaling the first authentication request to the second apparatus: signal, to the second apparatus using signaling according to the second security communication protocol, a request to use signaling according to the second security communication to exchange verifying information associated with the first security communication protocol; and receive, from the second apparatus using signaling according to the second communication protocol, an acceptance of said request to use said signaling according to the second security communication to exchange verifying information associated with the first security communication protocol.

FIG. 14 illustrates operations that may be performed by a second apparatus. The second apparatus may correspond to the second apparatus of FIG. 13. The second apparatus may be an AAA server.

During 1401, the second apparatus receives, from a first apparatus, an authentication request according to a second security communication protocol, the authentication request comprising an identifier of a cryptographic key and a first verifying information according to a second security communication protocol, wherein the first verifying information comprises a first value. The first apparatus may correspond to the first apparatus described above in relation to FIG. 13.

During 1402, the second apparatus obtains the cryptographic key using the identifier of the cryptographic key.

During 1403, the second apparatus verifies the first value using the cryptographic key identified by the identifier of the cryptographic key.

During 1404, the second apparatus derives a second verifying information according to a second security communication protocol, wherein the second verifying information comprises a second value calculated using the cryptographic key identified by the identifier of the cryptographic key.

During 1405, the second apparatus signals to the first apparatus an authentication response that comprises at least the second verification information.

The obtaining the cryptographic key may comprise: providing the identifier of the cryptographic key with a request for said cryptographic key to a key storage server configured to operate according to the first security communication protocol; and receiving, from the key storage server, the cryptographic key corresponding to the identifier of the cryptographic key.

The second apparatus may use the cryptographic key to verify said first value prior to using the received cryptographic key to derive the second verifying information. When the verification of the first value fails, steps 1404 and 1405 may not be performed. Instead, the second apparatus may signal an error response to the first apparatus. This error response may indicate to the first apparatus that the first value was not verified by the second apparatus.

Prior to receiving the authentication request, the second apparatus may: receive, from the first apparatus using signaling according to the second security communication protocol, a request to use signaling according to the second security communication to exchange verifying information according to the first security communication protocol; and signal, to the first apparatus using signaling according to the second communication protocol, an acceptance of said request to use said signaling according to the second security communication to exchange verifying information associated with the first security communication protocol.

In both of the examples of FIGS. 13 and 14, the first security communication protocol may be an Authentication and Key Management for Applications protocol, and the second security communication protocol may be an Internet Protocol-based security communication protocol. The Internet Protocol-based security communication protocol may be at least one of: a Remote Authentication Dial-In User Service protocol, or an Internet Key Exchange protocol, and an Internet Protocol Security protocol.

In both of the above examples of FIGS. 13 and 14, the first apparatus may be a Personal Internet of Things network element with gateway capability, and the second apparatus may be an Authentication, Authorization, and Accounting server.

In the above examples of FIGS. 13 and 14, the first apparatus may be a PECG/UE, the second apparatus may be an AAA server, the third apparatus may be a PINE for which the PECG is configured to act as a gateway to a network, the first protocol may be AKMA, the second protocol may be RADIUS and/or IKE/IPSec, and the identifier of the cryptographic key may be $K_{AF}$. It is understood that them entities may be labelled differently, without loss of generality of the presently described techniques.

Further, in all of the above examples of FIGS. 13 and 14, the verifying information may comprise information that is used to verify the origin and/or integrity of the message comprising the verifying information.

The presently described techniques have a plurality of advantages.

For example, the presently described principles may be applied in other contexts than that illustrated. For example, the present principles may be applied to secure IP-based protocols between a UE and an AF.

As another example, the presently described techniques allow AKMA to be leveraged to secure RADIUS between a UE/PEGC and a AAA server.

Further, the presently described techniques allow AKMA to be used to establish an IPsec tunnel between PEGC and AAA server, or more generally, between UE and an AF.

The presently described techniques further enable a seamless Integration of AKMA into RADIUS & IKEv2/IPSec protocol, with no configuration of extra credentials in PEGC/UE being needed with the presently described techniques. Further, protection is provided already from the initial message (for example, RADIUS access request secured by key $K_{AF}$), which improves the security of the messages being exchanged.

Figure 2:
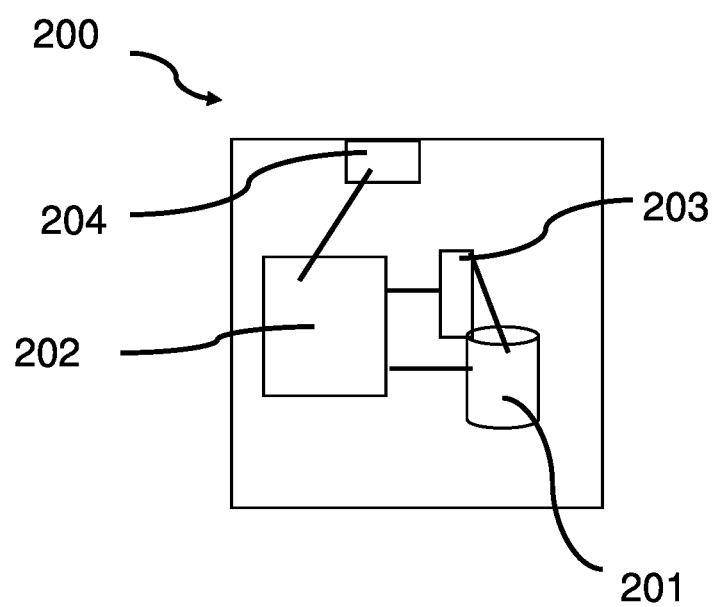
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
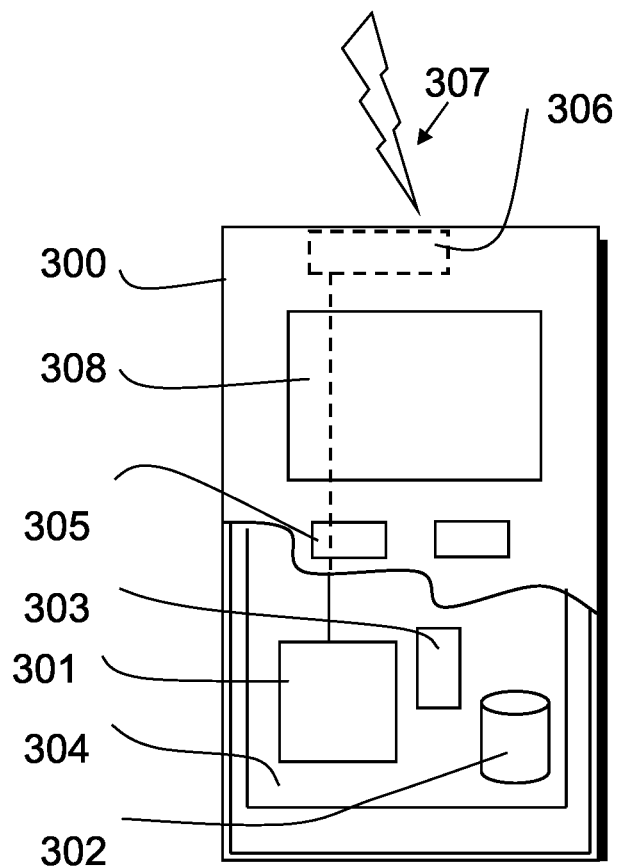
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of Tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
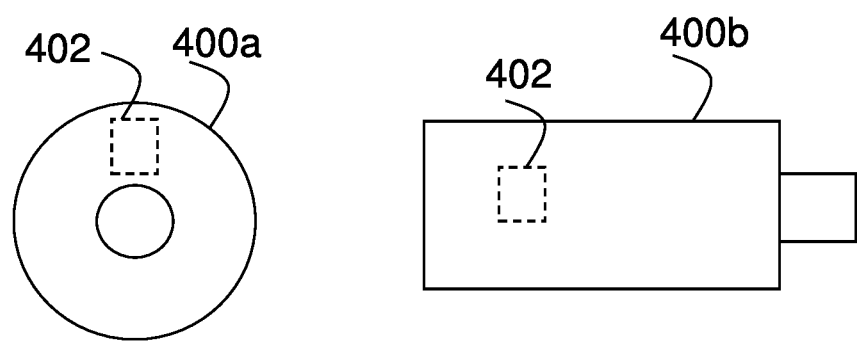
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 13, and/or FIG. 14, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 13, and/or FIG. 14, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASICs), gate level circuits and processors based on multicore processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
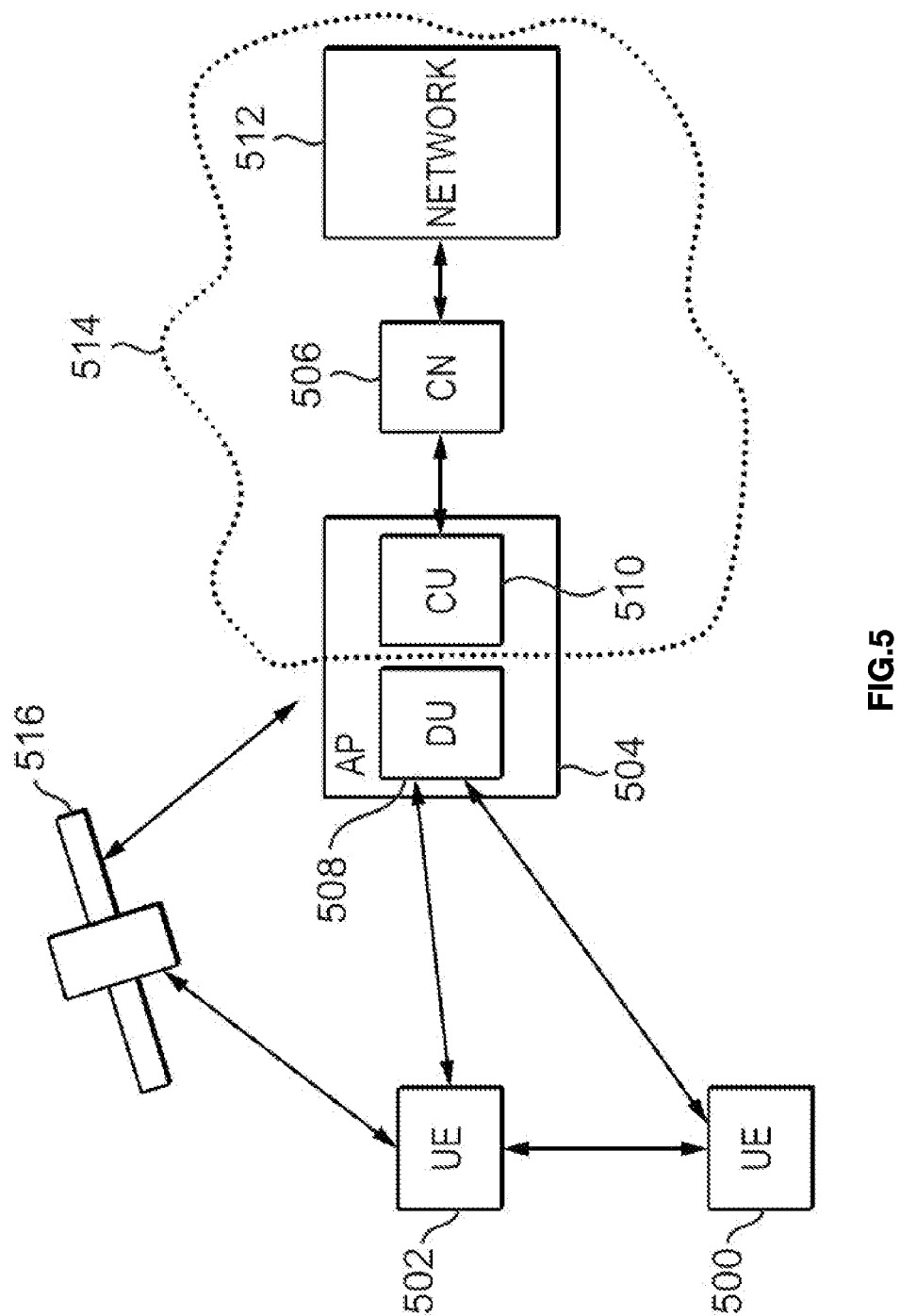
FIG. 5 shows a schematic representation of a network.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g) NodeB is further connected to the core network 506 (CN or next generation core NGC). Depending on the deployed technology, the (e/g)NodeB is connected to a serving and packet data network gateway (S-GW +P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also can store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells.

The invention claimed is:

1. A method, performed by a first apparatus, comprising:
   obtaining an identifier of a cryptographic key according to a first security communication protocol;
   receiving a first authentication request from a second apparatus, wherein the first apparatus is a Personal Internet of Things network element with gateway capability (PEGC) and the second apparatus is a Personal Internet of Things network element (PINE);
   signaling, in response to the first authentication request, a second authentication request according to a second security communication protocol to a third apparatus, the second authentication request comprising the identifier of the cryptographic key and a first verifying information according to the second security communication protocol, wherein the first verifying information comprises a first value calculated using the cryptographic key, wherein the third apparatus is an Authentication, Authorization, and Accounting (AAA) server, wherein the first security communication protocol is an Authentication and Key Management for Applications (AKMA) protocol and the second security communication protocol is an Internet Protocol (IP)-based security communication protocol, and wherein the IP-based security communication protocol is at least one of a Remote Authentication Dial-In User Service (RADIUS) protocol, an Internet Key Exchange (IKE) protocol, and an IP Security (IPSec) protocol;
   receiving, from the third apparatus, a first authentication response according to the second security communication protocol, the first authentication response comprising a second verifying information according to the second security communication protocol, wherein the second verifying information comprises a second value;
   verifying the first authentication response using the second value and the cryptographic key; and
   signaling, in response to the received first authentication response, a second authentication response to the second apparatus.

2. The method of claim 1, further comprising, prior to the step of signaling the second authentication request to the third apparatus:
   signaling, to the third apparatus using signaling according to the second security communication protocol, a request to use signaling according to the second security communication protocol to exchange verifying information associated with the first security communication protocol; and
   receiving, from the third apparatus using signaling according to the second security communication protocol, an acceptance of the request to use the signaling according to the second security communication protocol to exchange verifying information associated with the first security communication protocol.

3. A method for exchanging authentication and authorization messages in a Personal Internet of Things Network (PIN), the method performed by a third apparatus, the method comprising:
   receiving, from a first apparatus, a second authentication request according to a second security communication protocol in response to the first apparatus receiving a first authentication request from a second apparatus, the second authentication request comprising an identifier of a cryptographic key according to a first security communication protocol and a first verifying information according to the second security communication protocol, wherein the first verifying information comprises a first value, wherein the first apparatus is a Personal Internet of Things network element with gateway capability (PEGC), the second apparatus is a Personal Internet of Things network element (PINE), and the third apparatus is an Authentication, Authorization, and Accounting (AAA) server;
   obtaining the cryptographic key using the identifier of the cryptographic key;
   verifying the first value using the cryptographic key identified by the identifier of the cryptographic key;
   deriving a second verifying information according to the second security communication protocol, wherein the second verifying information comprises a second value calculated using the cryptographic key identified by the identifier of the cryptographic key, wherein the first security communication protocol is an Authentication and Key Management for Applications (AKMA) protocol and the second security communication protocol is an Internet Protocol (IP)-based security communication protocol, and wherein the IP-based security communication protocol is at least one of a Remote Authentication Dial-In User Service (RADIUS) protocol, an Internet Key Exchange (IKE) protocol, and an IP Security (IPSec) protocol; and signaling, to the first apparatus, an authentication response that comprises at least the second verification information.

4. The method of claim 3, wherein the step of obtaining the cryptographic key comprises:

providing the identifier of the cryptographic key with a request for the cryptographic key to a key storage server configured to operate according to the first security communication protocol; and receiving, from the key storage server, the cryptographic key corresponding to the identifier of the cryptographic key.

5. The method of claim 4, further comprising using the cryptographic key to verify the first value prior to using the received cryptographic key to derive the second verifying information.

6. The method of claim 3, further comprising, prior to the step of receiving the second authentication request:

receiving, from the first apparatus using signaling according to the second security communication protocol, a request to use signaling according to the second security communication protocol to exchange verifying information according to the first security communication protocol; and signaling, to the first apparatus using signaling according to the second security communication protocol, an acceptance of the request to use the signaling according to the second security communication protocol to exchange verifying information associated with the first security communication protocol.

7. A first apparatus comprising:

at least one processor; and at least one memory storing instructions that, when executed by the at least one processor, causes the first apparatus to perform:

obtaining an identifier of a cryptographic key according to a first security communication protocol;

receiving a first authentication request from a second apparatus, wherein the first apparatus is a Personal Internet of Things network element with gateway capability PEGC) and the second apparatus is a Personal Internet of Things network element PINE);

signaling, in response to the first authentication request, a second authentication request according to a second security communication protocol to a third apparatus, the second authentication request comprising the identifier of the cryptographic key and a first verifying information according to the second security communication protocol, wherein the first verifying information comprises a first value calculated using the cryptographic key, wherein the third apparatus is an Authentication, Authorization, and Accounting (AAA) server, wherein the first security communication protocol is an Authentication and Key Management for Applications (AKMA) protocol and the second security communication protocol is an Internet Protocol (IP)-based security communication protocol, and wherein the IP-based security communication protocol is at least one of a Remote Authentication Dial-In User Service (RADIUS) protocol, an Internet Key Exchange (IKE) protocol, and an IP Security (IPSec) protocol;

receiving, from the third apparatus, a first authentication response according to the second security communication protocol, the first authentication response comprising a second verifying information according to the second security communication protocol, wherein the second verifying information comprises a second value;

verifying the first authentication response using the second value and the cryptographic key; and signaling, in response to the received first authentication response, a second authentication response to the second apparatus.

8. The first apparatus of claim 7, further caused to perform, prior to the step of signaling the second authentication request to the third apparatus:

signaling, to the third apparatus using signaling according to the second security communication protocol, a request to use signaling according to the second security communication protocol to exchange verifying information associated with the first security communication protocol; and receiving, from the third apparatus using signaling according to the second security communication protocol, an acceptance of the request to use the signaling according to the second security communication protocol to exchange verifying information associated with the first security communication protocol.

9. A third apparatus comprising:

at least one processor; and at least one memory storing instructions that, when executed by the at least one processor, causes the third apparatus to perform:

receiving, from a first apparatus in a Personal Internet of Things Network (PIN), a second authentication request according to a second security communication protocol in response to the first apparatus receiving a first authentication request from a second apparatus, the second authentication request comprising an identifier of a cryptographic key according to a first security communication protocol and a first verifying information according to the second security communication protocol, wherein the first verifying information comprises a first value, wherein the first apparatus is a Personal Internet of Things network element with gateway capability (PEGC), the second apparatus is a Personal Internet of Things network element (PINE), and the third apparatus is an Authentication, Authorization, and Accounting (AAA) server;

obtaining the cryptographic key using the identifier of the cryptographic key;

verifying the first value using the cryptographic key identified by the identifier of the cryptographic key;

deriving a second verifying information according to the second security communication protocol, wherein the second verifying information comprises a second value calculated using the cryptographic key identified by the identifier of the cryptographic key, wherein the first security communication protocol is an Authentication and Key Management for Applications (AKMA) protocol and the second security communication protocol is an Internet Protocol (IP)-based security communication protocol, and wherein the IP-based security communication protocol is at least one of a Remote Authentication Dial-In User Service (RADIUS) protocol, an Internet Key Exchange (IKE) protocol, and an IP Security (IPSec) protocol; and signaling to the first apparatus an authentication response that comprises at least the second verification information.

10. The third apparatus of claim 9, wherein obtaining the cryptographic key comprises:
- providing the identifier of the cryptographic key with a request for the cryptographic key to a key storage server configured to operate according to the first security communication protocol; and
- receiving, from the key storage server, the cryptographic key corresponding to the identifier of the cryptographic key.

11. The third apparatus of claim 10, further caused to perform using the cryptographic key to verify the first value prior to using the received cryptographic key to derive the second verifying information.

12. The third apparatus of claim 9, further caused to perform, prior to receiving the second authentication request:
- receiving, from the first apparatus using signaling according to the second security communication protocol, a request to use signaling according to the second security communication protocol to exchange verifying information according to the first security communication protocol; and
- signaling, to the first apparatus using signaling according to the second security communication protocol, an acceptance of the request to use the signaling according to the second security communication protocol to exchange verifying information associated with the first security communication protocol.

* * * * *